United States Patent
Kurono et al.

(10) Patent No.: US 9,128,174 B2
(45) Date of Patent: Sep. 8, 2015

(54) RADAR APPARATUS

(75) Inventors: Yasuhiro Kurono, Kobe (JP); Tomohiro Shinomiya, Kobe (JP); Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 638 days.

(21) Appl. No.: 13/408,080

(22) Filed: Feb. 29, 2012

(65) Prior Publication Data

US 2012/0223855 A1 Sep. 6, 2012

(30) Foreign Application Priority Data

Mar. 4, 2011 (JP) ................................. 2011-048132

(51) Int. Cl.

| | |
|---|---|
| *G01S 13/08* | (2006.01) |
| *G01S 7/292* | (2006.01) |
| *G01S 13/58* | (2006.01) |
| *G01S 13/00* | (2006.01) |
| *G01S 7/28* | (2006.01) |
| *G01S 3/06* | (2006.01) |
| *G01S 7/483* | (2006.01) |

(52) U.S. Cl.
CPC ............... *G01S 7/2925* (2013.01); *G01S 3/06* (2013.01); *G01S 7/28* (2013.01); *G01S 7/2813* (2013.01); *G01S 7/483* (2013.01); *G01S 13/00* (2013.01)

(58) Field of Classification Search
CPC ......... G01S 7/2925; G01S 13/00; G01S 7/28; G01S 7/2813; G01S 3/06
USPC ........................................ 342/146, 189, 108
See application file for complete search history.

(56) References Cited

U.S. PATENT DOCUMENTS

| | | | |
|---|---|---|---|
| 3,495,246 A | * | 2/1970 | Schoneborn .................. 342/155 |
| 3,513,471 A | * | 5/1970 | Mooney, Jr. et al. ............ 342/91 |
| 3,720,941 A | | 3/1973 | Ares |

(Continued)

FOREIGN PATENT DOCUMENTS

| | | |
|---|---|---|
| EP | 0 611 969 A1 | 8/1994 |
| JP | A-06-242230 | 9/1994 |

(Continued)

OTHER PUBLICATIONS

Office Action issued in Japanese Patent Application No. 2011-048132 mailed Jun. 17, 2014 (with partial translation).

(Continued)

*Primary Examiner* — Frank J McGue
(74) *Attorney, Agent, or Firm* — Oliff PLC

(57) ABSTRACT

There is provided a radar apparatus of an electronic scan type configured to transmit an electric wave and calculate an angle of a target based on a phase difference of respective reception signals, thereby detecting a target position. An antenna unit transmits and receives the electric wave and provided with two transmission antennae. A transmission unit alternately transmits an electric wave having a first beam pattern and an electric wave having a second beam pattern from the two transmission antennae. First and second reception units calculate arrival angles and reception levels of reflected waves calculated from respective reception signals which are obtained by receiving the reflected waves by the first and second beam patterns. A comparison unit compares the reception levels by combining the arrival angles of the reflected waves. A determination unit determines whether a target actually exists at the arrival angles in accordance a comparison result.

9 Claims, 12 Drawing Sheets

(56) References Cited

U.S. PATENT DOCUMENTS

| | | | |
|---|---|---|---|
| 5,448,244 A * | 9/1995 | Komatsu et al. | 342/155 |
| 6,246,359 B1 | 6/2001 | Asano et al. | |
| 6,762,711 B1 | 7/2004 | Doerfler | |
| 2005/0128132 A1 | 6/2005 | Ziller et al. | |
| 2008/0258964 A1 | 10/2008 | Schoeberl et al. | |
| 2010/0134344 A1 | 6/2010 | Uesato | |

FOREIGN PATENT DOCUMENTS

| | | |
|---|---|---|
| JP | A-09-145839 | 6/1997 |
| JP | A-2000-090307 | 3/2000 |
| JP | A-2000-162310 | 6/2000 |
| JP | A-2000-258524 | 9/2000 |
| JP | A-2005-069739 | 3/2005 |
| JP | A-2006-091029 | 4/2006 |
| JP | A-2008-134223 | 6/2008 |
| JP | A-2010-002389 | 1/2010 |
| JP | A-2010-71865 | 4/2010 |
| JP | A-2010-139486 | 6/2010 |
| WO | WO 99/34234 A1 | 7/1999 |
| WO | WO 00/40999 A1 | 7/2000 |
| WO | 2004/077093 A1 | 9/2004 |
| WO | WO 2009/019881 A1 | 2/2009 |

OTHER PUBLICATIONS

Jun. 19, 2012 Search Report issued in European Patent Application No. 12157853.8.

Feb. 3, 2015 Office Action issued in Japanese Application No. 2011-048132.

Mar. 5, 2015 Office Action issued in European Application No. 12157853.8.

* cited by examiner

FIG. 2C    FFT PROCESSING RESULT OF RECEIVING
           ANTENNA A1 (FREQUENCY SPECTRUM)

UP BEAT

DOWN BEAT

FIG. 4

UP BEAT SIDE PEAK INFORMATION

|  | FREQUENCY | ANGLE | POWER |
|---|---|---|---|
| TARGET U1 | fu1 | θu1 | PWu1 |
| TARGET U2 |  | θu2 | PWu2 |
| TARGET U3 | fu2 | θu3 | PWu3 |
| TARGET U4 |  | θu4 | PWu4 |
| TARGET U5 |  | θu5 | PWu5 |
| TARGET U6 | fu3 | θu6 | PWu6 |

TARGET 1
TARGET 2
TARGET 3
TARGET 4
TARGET 5

DOWN BEAT SIDE PEAK INFORMATION

|  | FREQUENCY | ANGLE | POWER |
|---|---|---|---|
| TARGET D1 | fd1 | θd1 | PWd1 |
| TARGET D2 |  | θd2 | PWd2 |
| TARGET D3 | fd2 | θd3 | PWd3 |
| TARGET D4 |  | θd4 | PWd4 |
| TARGET D5 |  | θd5 | PWd5 |

RADAR APPARATUS

The disclosure of Japanese Patent Application No. 2011-048132 filed on Mar. 4, 2011, including specification, drawings and claims is incorporated herein by reference in its entirety.

BACKGROUND

The invention relates to a radar apparatus, and more particularly, to a radar apparatus that receives a reflected electric wave of electric waves transmitted from a vehicle, which is reflected from a target, by a plurality of receiving antennae and thus detects a position of the target.

There is a radar apparatus which measures a distance between a vehicle (own vehicle) that a driver drives and a preceding vehicle or front obstacle (target) or a target such as vehicle approaching from the rear and a direction thereof all the time and thus prevents a collision and performs an automatic traveling. In the radar apparatus, an electrical wave is transmitted from an antenna provided to the own vehicle, a reflected wave, which is reflected from the target, is received by the antenna, signal processing is performed for a signal obtained by the reception, an arrival direction of the reflected wave is estimated and thus the target is detected. As methods of estimating the arrival direction of the reflected wave, there are a DBF (Digital Beam Forming) method, a Capon method, an LP (Linear Prediction) method, a minimum norm method, a MUSIC (Multiple Signal Classification) method, an ESPRIT (Estimation of Signal Parameters via Rotational Invariance Techniques) method and a PRISM (Propagator method based on an Improved Spatial-smoothing Matrix) method.

The in-vehicle radar apparatus detects even a target in an area beyond a detection object area when the transmitted electric wave (beam) is enlarged. For example, when a traveling traffic lane on which the own vehicle travels is set as the detection object area, since even an obstacle beyond the traveling traffic lane is detected, it is necessary to determine whether the detected obstacle is an obstacle on the traveling traffic lane. Accordingly, an obstacle detection apparatus for vehicle mount disclosed in Patent Document 1 includes a distance measurement means that transmits an electric wave and thus measures a distance to an object and a received electric wave strength detection means that detects a received electric wave strength of the electric wave reflected at the object, and determines whether the detected object is a vehicle to be originally detected or an obstacle beyond the traveling traffic lane from a change in the strength of the received electric wave in accordance with the measured distance.

The in-vehicle radar apparatus disclosed in Patent Document 1 is an apparatus that receives the electric wave reflected at the obstacle by one antenna. Compared to this, an electronic scan radar (for example, refer to Patent Document 2) has been known which receives a transmission electric wave transmitted toward the front of the own vehicle and an electric wave reflected from a target by a plurality of antennae and calculates an angle of the target (an angle indicating how much the target is deviated from the traveling direction of the own vehicle) from a phase difference between the obtained received electric waves. In the electronic scan radar, the target detection is performed by detecting the phase difference, which is performed by using the plurality of receiving antennae, within a range of ±180°.

Patent Document 1: JP 2005-69739A (FIGS. 1 to 4)
Patent Document 2: JP 2006-91029A (FIGS. 1 and 3)

In the electronic scan radar using the receiving antennae, when the reflected wave from the target is received to estimate the arrival direction of the electric wave, the detection range of the phase difference is ±180°. Accordingly, when an electric wave having a phase difference of 360° or larger from the transmission electric wave, for example an electric wave having a phase difference of 420° is received, the corresponding electric wave is erroneously detected as the received electric wave having a phase difference of 60° (which is obtained by subtracting 360° from 420°), so that the angle of the target is erroneously detected.

In order to solve the above problem, a method of narrowing an interval of the receiving antennae (i.e., widening an angle range to be detected) may be considered. However, when the interval of the antennae is narrowed, an interference of the received electric waves between the receiving antennae is caused, so that power and accuracy of the phase are lowered. As a result, the angle estimation accuracy, which is required for the radar apparatus, is reduced, so that the resolution capability cannot be satisfied.

SUMMARY

It is thereof an object of the present invention to solve the above problem in the radar apparatus of the electronic scan method of calculating an angle of a target from a phase difference of reception signals, which are obtained by receiving reflected waves of transmitted electric waves with a plurality of antennae, and thus detecting a target position, and even when an electric wave having a phase difference of 360° or greater is received by the receiving antenna, to determine whether a target is a correct target by strengths of the reception signals of the respective antennae, thereby improving accuracy of the radar apparatus of the electronic scan type.

According to the aspect of the embodiments of the present invention, there is provided a radar apparatus of an electronic scan type configured to transmit an electric wave and calculate an angle of a target based on a phase difference of respective reception signals which are obtained by receiving reflected waves at a plurality of receiving antennae, thereby detecting a target position, the radar apparatus comprising: an antenna unit configured to transmit and receive the electric wave and provided with two transmission antennae; a transmission unit configured to alternately transmit an electric wave having a first beam pattern and an electric wave having a second beam pattern from the two transmission antennae, the first beam pattern and the second beam pattern being different from each other; a first reception unit configured to calculate an arrival angle and a reception level of a reflected wave calculated from respective reception signals which are obtained by receiving the reflected wave by the first beam pattern; a second reception unit configured to calculate an arrival angle and a reception level of a reflected wave calculated from respective reception signals which are obtained by receiving the reflected wave by the second beam pattern; a comparison unit configured to compare the reception levels calculated by the first and second reception units by combining the arrival angles of the reflected waves, and determine whether a level difference of the reception levels is a predetermined reception level difference or greater; and a determination unit configured to determine whether a target actually exists at the arrival angles of the reflected waves in accordance a determination result of the comparison unit.

In the radar apparatus of the aspect of the embodiments of the present invention, i.e., the radar apparatus of the electronic scan type of calculating an angle of a target from a phase difference of reception signals, which are obtained by receiving reflected waves of transmitted electric waves with a plurality of antennae, and thus detecting a target position, the electric waves having different beam patterns are transmitted by the two transmission antennae. Therefore, even when a reflected wave having a phase difference of 360° or greater is received by a receiving antenna, it is possible to determine whether a target is a correct target, based on the strengths of the reception signals of the respective antennae due to the difference of the beam patterns of the transmission electric waves, so that it is possible to improve the accuracy of the radar apparatus of the electronic scan method.

In this case, the beam patterns transmitted from the two transmission antennae may be configured as follows. A wide transmission beam pattern may be transmitted from one antenna and a narrow beam pattern may be transmitted from the other antenna. Alternatively, the detection ranges of the two transmission antennae may be deviated from each other. Thereby, even when the signals received by the plurality of receiving antennae include a reception signal of a reflected wave having a phase difference of 360° or greater, it is possible to determine whether a target is a correct target, based on the reception signal strengths of the respective antennae for each azimuth.

BRIEF DESCRIPTION OF THE DRAWINGS

In the accompanying drawings:

FIG. 2C is waveform diagrams of frequency spectra showing results of FFT processing of UP and DOWN beats output from individual reception units of one receiving antenna shown in FIG. 1;

FIG. 4 illustrates that peak information of an UP beat side and peak information of a DOWN beat side are paired in an azimuth calculation unit of FIG. 1;

DETAILED DESCRIPTION OF THE EMBODIMENTS

Hereinafter, illustrative embodiments of the invention will be specifically described with reference to the accompanying drawings.

Figure 1:
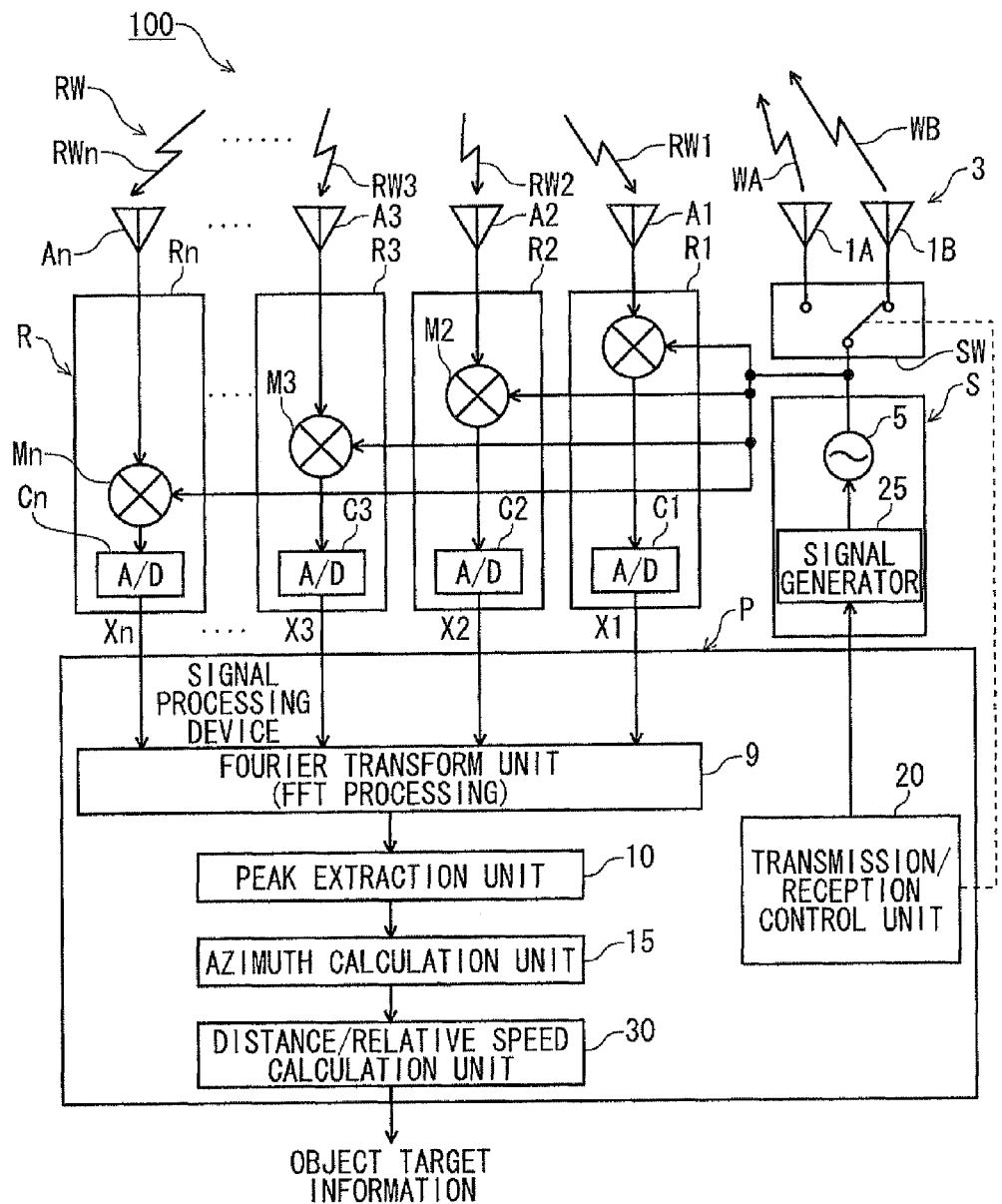
FIG. 1 is a view showing a configuration of a radar apparatus of a FMCW method according to an illustrative embodiment of the invention.

FIG. 1 shows a configuration of a radar apparatus 100 according to an illustrative embodiment of the invention. The radar apparatus 100 of this illustrative embodiment includes a transmission unit S, a reception unit R and a signal processing device P. Although not specifically shown, the signal processing device P is configured by a microcomputer and has a Fourier transform unit 9, a peak extraction unit 10, an azimuth calculation unit 15, a distance/relative speed calculation unit 30 and a transmission/reception control unit 20.

The transmission unit S includes an oscillator 5, a signal generator 25, two transmission antennae 1A, 1B and a change-over switch SW. The signal generator 25 is controlled by the transmission/reception control unit 20 of the signal processing device P. The signal generator 25 supplies, as a transmission signal, a modulation signal (triangular wave) having a triangular waveform to the oscillator 5, thereby performing a frequency modulation. The transmission signal from the oscillator 5 is transmitted, as an electronic wave (transmission wave WA, WB), from any one of the transmission antennae 1A, 1B as the change-over switch SW is switched. The change-over switch SW is switched by a signal from the transmission/reception control unit 20 every one period of the triangular wave generated in the signal generator 25, and beam patterns of the electronic waves, which are generated in the oscillator 5 and transmitted from the transmission antennae 1A, 1B, are different from each other, which will be described later. In this illustrative embodiment, an FMCW method is used and the oscillator 5 generates the transmission wave W that changes with a predetermined repeating period by the triangular wave of the signal generator 25. Accordingly, the transmission wave W is an FMCW wave having a frequency that goes up and down with a predetermined repeating period, as a center of a signal generation frequency at the time of non-modulation of the oscillator 5. The transmission wave W may be power-amplified in a transmitter (not shown) and then transmitted (emitted) from the transmission antenna 1 toward a target.

In this illustrative embodiment, the radar apparatus 100 is mounted on a vehicle and the transmission wave W is transmitted toward the front or rear of the vehicle having the radar apparatus 100 mounted thereon. The transmission wave W transmitted from the transmission antenna 1 toward the front is reflected at a target (not shown), for example preceding vehicle, a stopped object and the like and a reflected wave RW is returned to the vehicle and is received in the reception unit R of the radar apparatus 100.

The reception unit R includes an array antenna 3 having n receiving antennae A1 to An and individual receiving units R1 to Rn connected to the receiving antennae. The individual R1 to Rn have mixers M1 to Mn and A/D converters (A/D in FIG. 1) C1 to Cn, respectively. Reception signals, which are obtained from the reflected waves RW1 to RMn received by the array antenna 3, are amplified in low noise amplifiers (not shown) and then sent to the mixers M1 to Mn. The transmission signal from the oscillator 5 of the transmission unit S is input into the mixers M1 to Mn. The transmission signal and reception signals are mixed in the mixers M1 to Mn, respectively, so that beat signals having frequencies, which correspond to differences between a frequency of the transmission signal and frequencies of the reception signals, are obtained. The beat signals from the mixers M1 to Mn are converted into digital reception signals in the A/D converters C1 to Cn and then supplied to a fast Fourier transformer of the Fourier transform unit 9, in which a frequency analysis (FFT processing) by the fast Fourier transform is performed for each of the digital reception signals X1 to Xn.

Figure 2A:
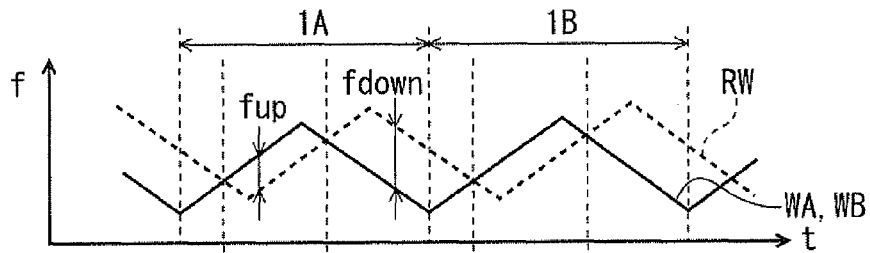
FIG. 2A is a waveform diagram of transmission signals emitted from a transmission unit of the radar apparatus shown in FIG. 1.

In the radar apparatus 100 of this illustrative embodiment, when a target is moving, the frequency of the reflected wave RW includes a Doppler frequency component that is proportional to a relative speed of the target and an own vehicle. Also, in this illustrative embodiment, the FWCW is adopted as the modulation method. Accordingly, when the frequency shift is a linear chirp, the frequency of the reflected wave RW includes not only the Doppler component but also a frequency component reflecting delay time that is added as the transmission wave spreads over a distance between the target and the own vehicle. As described above, since the transmission signal is the linear chirp signal, the frequency of the transmission signal repeats a period (ascending section) in which the frequency linearly increases and a period (descending section) in which the frequency linearly decreases, as shown with the solid line in the waveform diagram of FIG. 2A. Specifically, the transmission wave WA is transmitted by the transmission antenna 1A in a transmission one period section consisting of the ascending section and descending section and the transmission wave WB is transmitted by the transmission antenna 1B in a next one period section. Even after that, the transmission waves are transmitted by alternately changing the transmission antennae 1A, 1B every one period. As shown with the broken line in the waveform diagram of FIG. 2A, compared to the transmission wave W, the reflected wave RW is affected by the Doppler frequency shift due to the relative speed and the time delay due to the relative distance. Hence, in general, differences between the transmission wave W and the reflected wave RW are different in the ascending and descending sections.

Figure 2B:
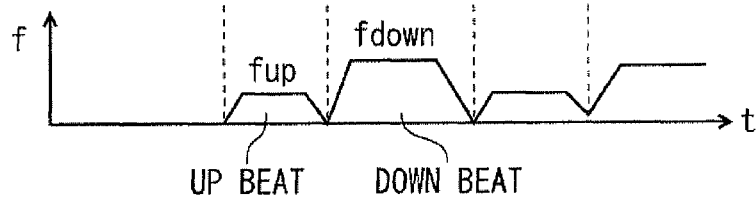
FIG. 2B is a waveform diagram showing a frequency change of a signal reflected from a target with respect to time and a beat signal in a mixer.
Figure 2B:
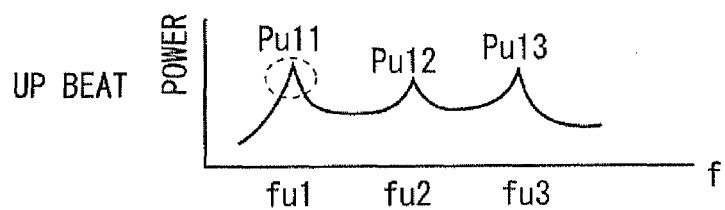
Figure 2B:
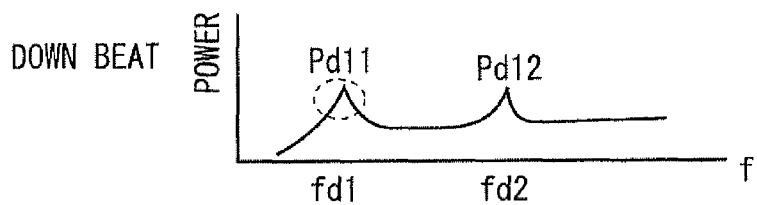

That is, a difference frequency between the transmission wave W and the reflected wave RW is fup in the ascending section and fdown in the descending section. Therefore, in each of the mixers M1 to Mn, a beat signal shown in the waveform diagram of FIG. 2B having the Doppler frequency overlapped over the frequency based on the delay time is obtained. The beat signal in the ascending section is referred to as UP beat and the beat signal in the descending section is referred to as DOWN beat. Meanwhile, FIGS. 2A and 2B show that the frequency fdown of the DOWN beat is higher than the frequency fup of the UP beat and the relative speed in a direction (approaching direction) that a relative distance to the target becomes smaller.

As described above, the beat signals of UP beats and DOWN beats obtained in the respective mixers M1 to Mn are converted into the digital reception signals X1 to Xn in the A/D converters C1 to Cn and then supplied to the Fourier transform unit 9. In the Fourier transform unit 9, the UP beat frequency fup components and DOWN beat frequency fdown components from the respective mixers M1 to Mn are respectively supplied to the fast Fourier transformer in which the frequency analysis (FFT processing) by the fast Fourier transform is then performed for each of the digital reception signals X1 to Xn. Here, a result of the FFT processing of the receiving antenna A1 is shown in FIG. 2C. A waveform diagram in the upper part of FIG. 2C shows a frequency spectrum that is obtained from the UP beat frequency fup components and a waveform diagram in the lower part of FIG. 2C shows a frequency spectrum that is obtained from the DOWN beat frequency fdown components.

As shown in FIG. 2C, the frequency spectrum, which is the result of the FFT processing for the UP beats of the antenna A1, has peaks Pu11, Pu12 and Pu13 at UP frequencies fu1, fu2, fu3, respectively. Also for the antennae A2 to An, the same FFT processing results having the same peak frequencies are obtained. For example, for the antenna A2, an FFT processing result having peaks Pu21, Pu22 and Pu23 at UP frequencies fu1, fu2, fu3 is obtained. Also, the frequency spectrum, which is the result of the FFT processing for the DOWN beats of the antenna A1, has peaks Pd11 and Pd12 at DOWN frequencies fd1, fd2, respectively. Also for the receiving antennae A2 to An, the same FFT processing results having the same peak frequencies are obtained. For example, for the antenna A2, an FFT processing result having peaks Pd21 and Pd22 at DOWN frequencies fd1, fd2 is obtained.

That is, since the respective receiving antennae A1 to An receive the reflected wave RW from the same target, the frequency spectra of the same shape having the same peak frequencies are obtained in the FFT processing. However, since phases of the reflected waves are different depending on the receiving antennae, phase information having the peaks of the same frequencies is different for each of the receiving antennae.

Returning to FIG. 1, an output of the Fourier transform unit 9 is supplied to the peak extraction unit 10. In the peak extraction unit 10, peaks having predetermined power or greater in the UP beats and DOWN beats are extracted from the frequency spectra obtained in the FFT processing for the respective receiving antennae A1 to An, and frequencies, powers and phase information of the extracted peaks (hereinafter, referred to as peak frequency information) are extracted. The peak frequency information extracted in the peak extraction unit 10 is supplied to the azimuth calculation unit 15.

Figure 3:
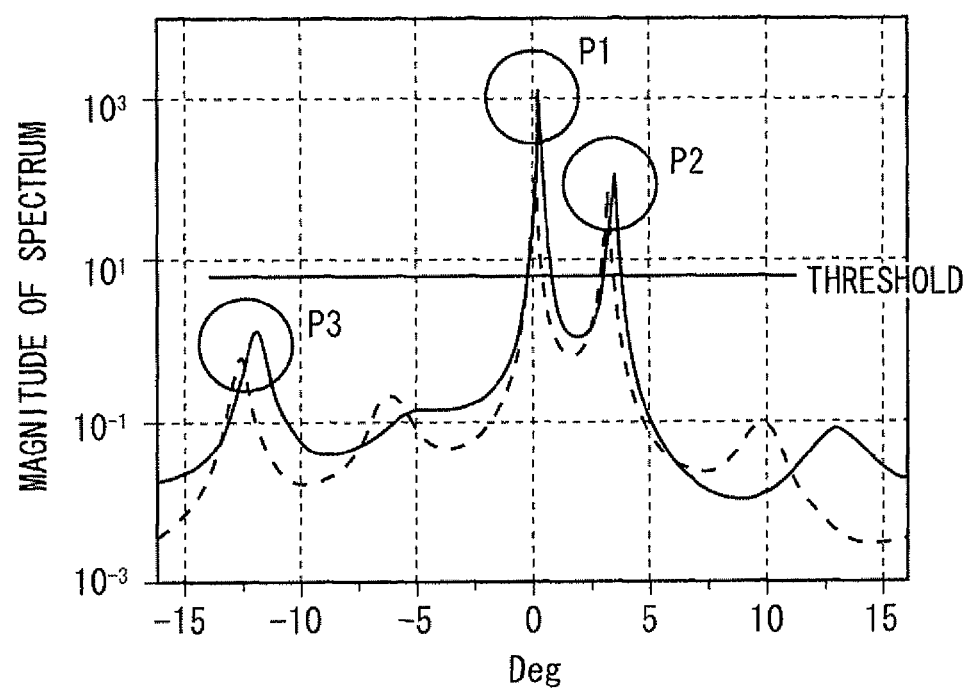
FIG. 3 is a characteristic view showing magnitudes of spectra with respect to angles when reflected waves from a target are received by a plurality of antennae provided at an equal interval and the received reflected waves are processed by an angle estimation method of the related art.

Since one peak of the frequency spectrum typically includes information of a plurality of targets, it is necessary to separate a target from the one peak and to estimate an angle of the separated target. Therefore, the azimuth calculation unit 15 calculates angle spectra as shown in FIG. 3, based on the peak frequency information (for example, for UP beat, Pu11, Pu21, ..., Pun1 and for DOWN beat, Pd11, Pd21, ..., Pdn1) of peaks having the same frequency in each of UP and DOWN sides in all the receiving antennae A1 to An. As the method of calculating the angle spectrum, a Capon method, a DBF method and the like may be used. In FIG. 3, the solid line indicates the angle spectrum of the UP peak frequency fu1 (Pu11, Pu21, Pun1) and the broken line indicates the angle spectrum of the DOWN peak frequency fd1 (Pd11, Pd21, ..., Pdn1).

The azimuth calculation unit 15 determines that peaks having power of a threshold or greater in the angle spectra shown in FIG. 3, here peaks P1, P2 are the targets and extracts angles and powers thereof. More specifically, the angle spectrum is obtained for each of the peak frequencies of the FFT processing. In the example of FIG. 2C, five angle spectra are calculated for the five frequencies fu1, fu2, fu3, fd1 and fd2. FIG. 3 showing the angle spectrum calculated from the peaks of the UP peak frequency fu1 and the angle spectrum calculated from the peaks of the DOWN peak frequency fd1 indicates that there are two targets P1 (angle of 0°) and P2 (angle of about 3°) in the UP peak frequency fu1 and the DOWN peak frequency fd1, respectively. The result obtained in the azimuth calculation unit 15 is shown in FIG. 4, for example.

The distance/relative speed calculation unit 30 pairs the target information of the UP beat side and the target information of the DOWN beat side having close angles and powers, based on the data shown in FIG. 4. FIG. 4 shows that a target U1 having an angle θu1 of the frequency fu1 of the UP beat side and a target D2 having an angle θd2 of the frequency fd1 of the DOWN beat side are paired and that five targets are detected. By the UP frequencies and DOWN frequencies obtained through the pairing, the distance/relative speed calculation unit calculates a distance and a relative speed. As an angle of the target, an average of the angles of the UP beat side and DOWN beat side is taken. The distance and relative speed are calculated from the UP peak frequency fu1 and DOWN peak frequency fd1 and the angle is calculated from an equation of $(\theta u1+\theta d2)/2$.

Figure 5A:
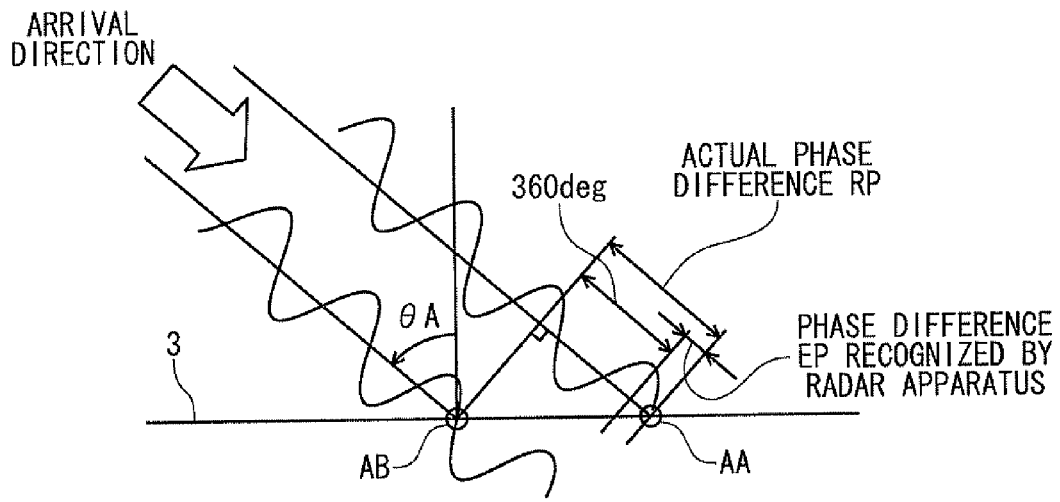
FIG. 5A illustrates a state in which an arrival wave having an actual phase difference exceeding 360° is recognized as a phase difference below 180° in a radar.
Figure 5B:
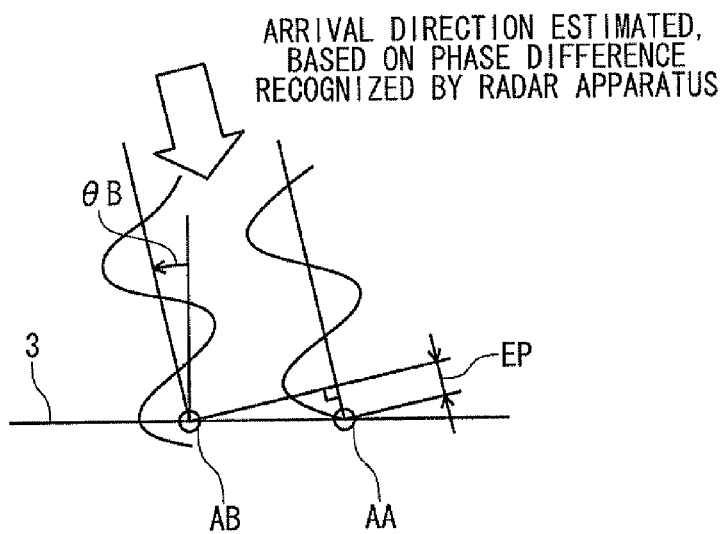
FIG. 5B shows a direction of the arrival wave that is recognized by the erroneous phase difference of FIG. 5A.

FIG. 5A shows a case where there is a phase difference RP actually exceeding 360° in the electric waves received by the two adjacent antennae AA, AB on the array antenna 3 (angles (arrival angles) of an arrival direction are all θA° when a front face of the array antenna 3 is considered as 0°). In this case, since a phase difference EP of reception waves that the radar apparatus can recognize is smaller than ±180°, the phase difference RP of the reception waves recognized by the radar apparatus becomes a value obtained by subtracting 360° from the actual phase difference RP. As a result, when estimating a direction of the arrival waves, based on the phase difference EP of the reception waves recognized by the radar apparatus, the arrival angle to the array antenna 3 becomes θB° (<the arrival angle θA°), as shown in FIG. 5B, so that the direction becomes different from the actual arrival direction of the electric waves shown in FIG. 5A.

Figure 6A:
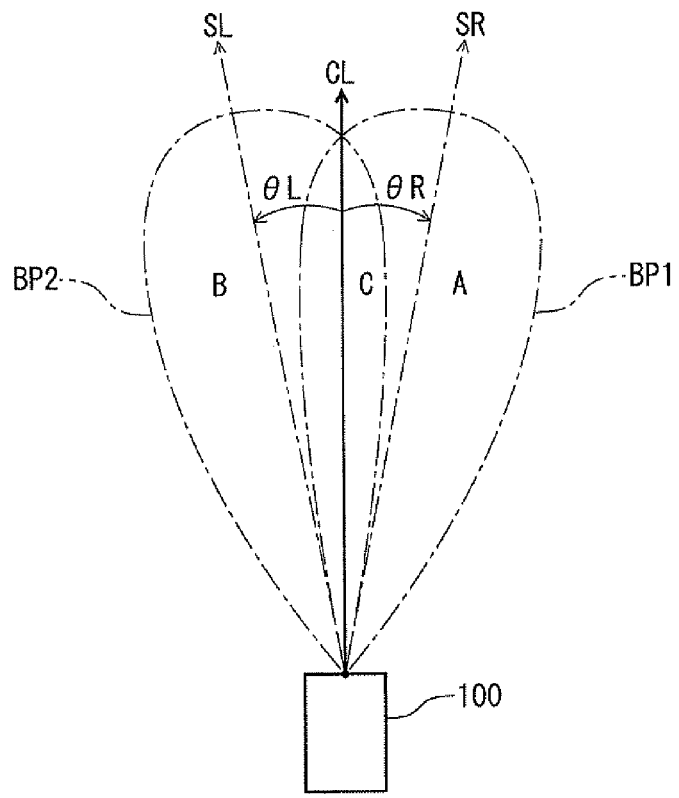
FIG. 6A shows a first illustrative embodiment of two beam patterns of transmission waves transmitted from two antennae shown in FIG. 1.

Therefore, according to the illustrative embodiment shown in FIG. 1, in the radar apparatus 100 configured as described above, the transmission signal generated in the oscillator 5 is alternately transmitted from the transmission antennae 1A, 1B while changing a beam pattern thereof by changing pattern shapes of the respective antennae. FIG. 6A shows exemplary beam patterns BP1, BP2 of two electric waves that are transmitted from the transmission antennae 1A, 1B. The beam pattern BP1 of the electric wave transmitted from the transmission antenna 1A and the beam pattern BP2 of the electric wave transmitted from the transmission antenna 1B have the same pattern shape with respect to a transmission direction, are substantially symmetric (linearly symmetric) about the transmission direction and have different transmission directions (transmission axes) thereof.

That is, the electric wave having the beam pattern BP1 transmitted from the transmission antenna 1A is transmitted in a transmission direction SR that is inclined rightward from a central axis CL of the radar apparatus 100 by a predetermined angle θR and the electric wave having the beam pattern BP2 transmitted from the transmission antenna 1B is transmitted in a transmission direction SL that is inclined leftward from the central axis CL of the radar apparatus 100 by a predetermined angle θL (=θR). As a result, the beam pattern BP1 and the beam pattern BP2 have a linear symmetry about the central axis CL.

Here, regarding an area of a predetermined range at the front of the radar apparatus 100, an area in which the phase difference of the reception wave, which can be recognized by the radar apparatus, is smaller than ±180° is referred to as a C zone, an area that is positioned at the right side (+side) of the C zone is referred to as an A zone and an area that is positioned at the left side (−side) of the C zone is referred to as a B zone. The A zone and the B zone are areas in which a target does not actually exist in the arrival directions of the electric waves. Also, an electric wave from an area in which a target does not actually exist in the arrival direction of the received electric wave is referred to as a phase folding ghost.

Figure 6B:
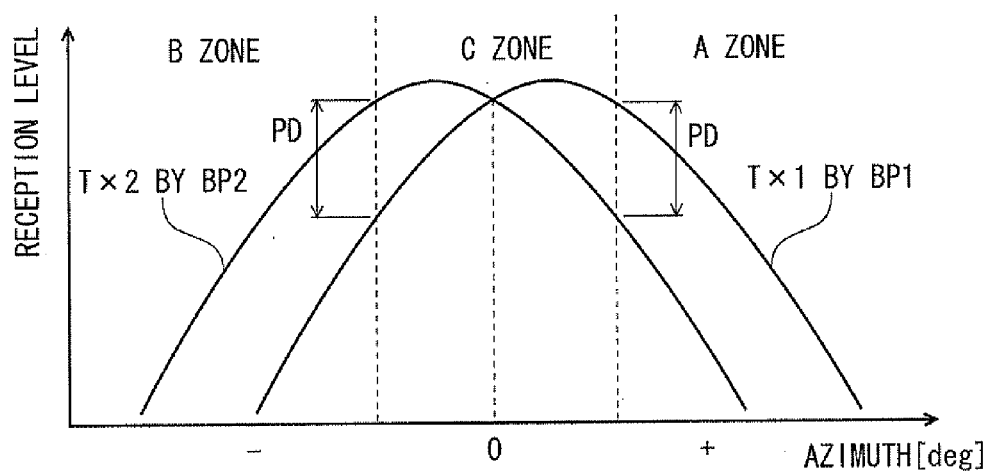
FIG. 6B shows reception levels of reflected signals by the two beam patterns shown in FIG. 6A with respect to an azimuth.

Accordingly, a reception level of the reflected wave from a target that is in the A zone at the front of the radar apparatus 100 is higher when the electric wave having the beam pattern BP1 is transmitted from the transmission antenna 1A and a reception level of the reflected wave from a target that is in the B zone at the front of the radar apparatus 100 is higher when the electric wave having the beam pattern BP2 is transmitted from the transmission antenna 1B. FIG. 6B shows the reception levels of the reflected waved by the two beam patterns BP1, BP2 of FIG. 6A with respect to the azimuth. In the radar apparatus 100 of this illustrative embodiment, even when an azimuth of the target obtained by the calculation is in the C zone, it is possible to determine whether the azimuth is an azimuth of a correct target in the C zone or an azimuth of an incorrect target due to the phase folding in the A or B zone, from a power difference of the reception levels. Thereby, it is possible to calculate the arrival direction of the original reflected wave.

That is, in the A zone, the reception level of the reflected wave by the beam pattern BP1 is higher than the reception level (reception power is the same) of the reflected wave by the beam pattern BP2 and a difference of the reception levels is also high. Also, in the B zone, the reception level of the reflected wave by the beam pattern BP2 is higher than the reception level of the reflected wave by the beam pattern BP1 and a difference of the reception levels is also high. In the C zone, a difference of the reception level of the reflected wave by the beam pattern BP1 and the reception level of the reflected wave by the beam pattern BP2 is small. Here, it is assumed that the differences of the reception levels of the reflected waves by the beam pattern BP1 and the beam pattern BP2 are the same at a boundary between the A zone and the C zone and a boundary between the B zone and the C zone, and both the differences of the receptions levels are indicated with PD.

As a method of estimating the arrival direction of the reflected wave by using the difference of the reception levels, there are two methods. In a first method, ranges of power differences of the reception levels in the A, B and C zones are preset for each zone from actually measured values (or designed values) of the reception levels of the reflected waves by the beam patterns transmitted from the antennae 1A, 1B, and it is determined that a difference of the actually measured reception levels of the reflected waves corresponds to a level difference of which zone. When a difference of the actually measured reception levels of the reflected waves is in the A and B zones, a target may be determined as a phase folding ghost.

In a second method, the reception levels of the reflected waves by the beam patterns transmitted from the antennae 1A, 1B are measured in advance, a map of the reception angles and power difference of the reflected waves is thus prepared and stored beforehand in the radar apparatus. Then, candidate angles including the phase folding ghost are obtained with respect to the angles of the targets calculated from the reception levels of the reflected waves received by the radar apparatus in a normal control mode. Lastly, the power differences of the calculated angles are obtained and an angle having the closest value to the map value of the power differences of the candidate angles is taken as the arrival direction of the reflected wave.

For example, when an actually measured angle is 0°, the candidate angles may be 0°, −47.68° corresponding to the folding ghost from the (−) direction and +47.68° corresponding to the folding ghost from the (+) direction. Then, it is determined that the actually measured power difference is closest to which one of the map values of the power differences of the three candidate angles. As a result, when the map value of 0° is closest, it can be determined that the calculated angle (0°) is an angle of the correct target. When the map value of −47.68° is closest, it can be determined that the calculated angle (0°) is actually the folding ghost from −47.68° and does not indicate an angle of the correct target. The first method has a processing load smaller than that of the second method. However, the second method has the higher accuracy. It may be possible to determine whether the first method or second method is adopted, considering the processing load and the accuracy.

Figure 7:
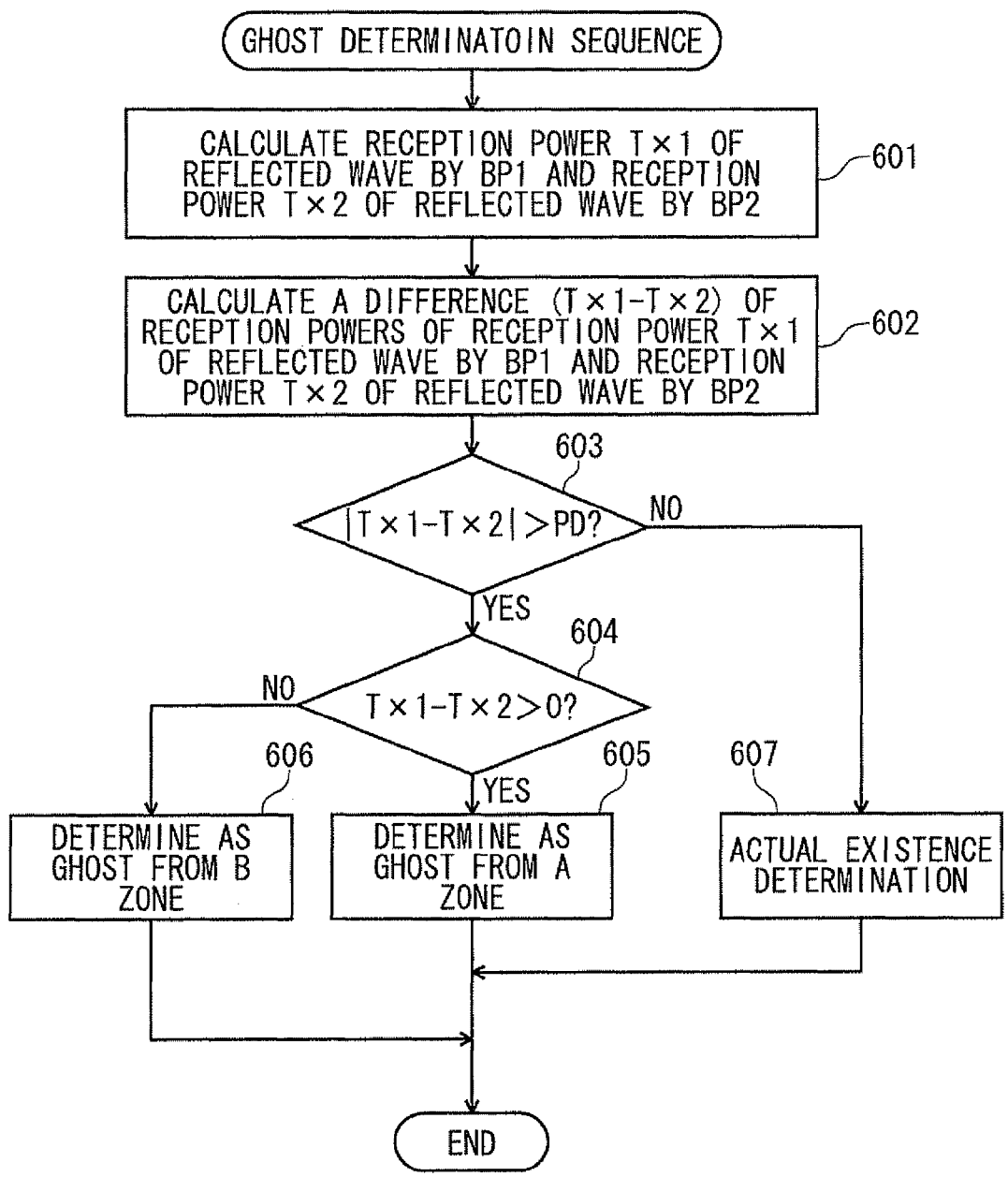
FIG. 7 is a flowchart showing an example of a sequence of a folding ghost determination when the beam patterns of the first illustrative embodiment are used in the radar apparatus of the invention.

FIG. 7 is a flowchart showing an example of a sequence of a phase folding ghost determination when the beam patterns BP1, BP2 of the first illustrative embodiment are used. The determination is performed after the azimuths of the beam patterns BP1, BP2 are respectively detected by the azimuth calculation unit 15 of the signal processing apparatus P shown in FIG. 1. Meanwhile, in the below descriptions, when the transmission power from the antenna is high, it is described that the antenna transmission power is high, and a magnitude of the antenna reception level is described as reception power.

In a step 601, reception power Tx1 of the reflected wave by the beam pattern BP1 and reception power Tx2 of the reflected wave by the beam pattern BP2 from the same direction are calculated. In a step 602, a difference (Tx1−Tx2) between the reception power Tx1 and the reception power Tx2 is calculated.

In a step 603, it is determined whether an absolute value |Tx1−Tx2| of the difference between the reception power Tx1 and the reception power Tx2 is larger than the level difference PD. When the absolute value |Tx1−Tx2| of the difference between the reception power Tx1 and the reception power Tx2 is larger than the level difference PD, the process proceeds to a step 604. In the step 604, it is determined whether the difference (Tx1−Tx2) between the reception power Tx1 and the reception power Tx2 is positive or not. When (Tx1−Tx2)>0 (YES), the process proceeds to a step 605 and it is determined that the reflected wave is a folding ghost from the A zone (it is simply described in FIG. 7 that a ghost is determined). Otherwise (NO), the process proceeds to a step 606, it is determined that the reflected wave is a folding ghost from the B zone, and then the routine is ended.

On the other hand, when it is determined in the step 603 that the absolute value |Tx1−Tx2| of the difference between the reception power Tx1 and the reception power Tx2 is smaller than the level difference PD, the process proceeds to a step 607, an actual existence determination of determining that the reflected wave is in the C zone and a target actually exists is performed and then the routine is ended. In this illustrative embodiment, the difference of the reception powers is calculated in the step 602 and the difference is compared with the level difference PD in the step 603. However, it may be possible to determine whether a target actually exists or is a ghost by comparing one reception power +PD with the other reception power without calculating the difference.

Figure 8A:
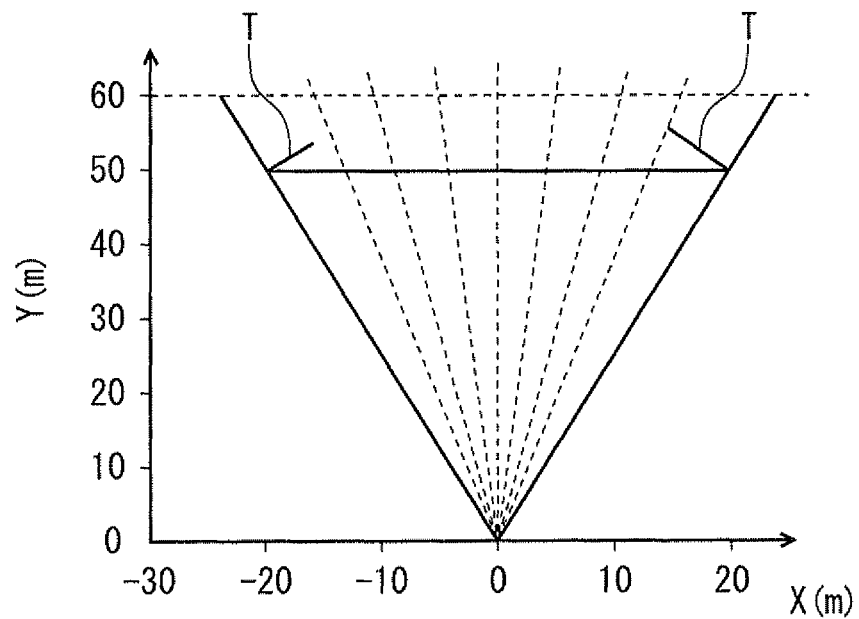
FIG. 8A shows a state in which a folding ghost occurs in a radar apparatus of the related art.
Figure 8B:
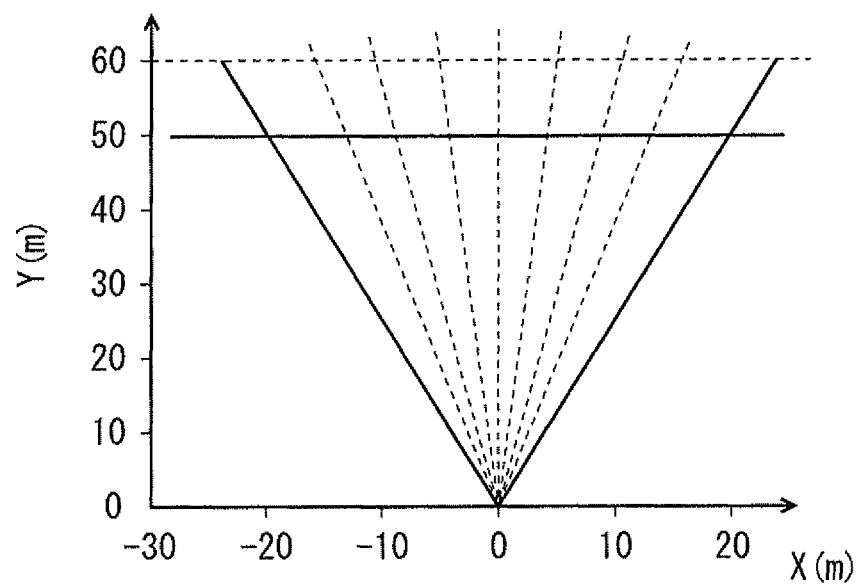
FIG. 8B is an output diagram of a target position in the radar apparatus of the invention.

FIG. 8A is a simulation result showing a state in which a folding ghost occurs in a radar apparatus of the related art and FIG. 8B is a result of a simulation of obtaining a target position in the radar apparatus configured as shown in FIG. 1. In the radar apparatus of the related art, ±21.7° is the limit. That is, in a range beyond the limit, a value of a different angle is output, so that the phase folding T occurs. In contrast, in the radar apparatus of the invention, an angle beyond the range of ±21.7° can be detected.

Like this, in the radar apparatus of this illustrative embodiment, it is possible to cope with the phase folding ghost, so that an unnecessary operation of the radar apparatus disappears due to the reduction of the phase folding ghost and the arrival direction of the reflected wave in the range of the wider angle than the related art can be detected. Like this, it is possible to prevent the erroneous determination by using the power difference, i.e., the difference of the reception powers. In the meantime, the reception power described in the specification is an output of the FFT when the angle measuring method is a mono pulse method, and is a spectrum value of an extracted angle when an angle estimation unit is provided. Also, when the angle estimation unit is provided, the accuracy is improved if a spectrum value of an angle, which is extracted by using the beam scanning method (DBF method, Capon method and the like), is calculated.

Figure 9A:
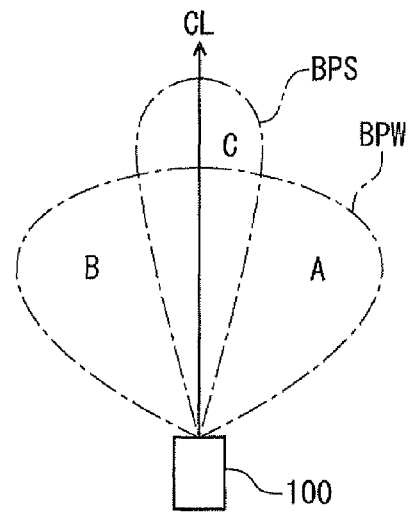
FIG. 9A shows a second illustrative embodiment of two beam patterns of transmission waves transmitted from two antennae shown in FIG. 1.

In the below, a second illustrative embodiment of the invention is described in which different beam patterns are alternately transmitted from the two transmission antennae 1A, 1B of the radar apparatus 100 shown in FIG. 1. FIG. 9A shows beam patterns BPS and BPW of the second illustrative embodiment of the two electric waves transmitted from the transmission antennae. Like the first illustrative embodiment, regarding an area of a predetermined range at the front of the radar apparatus 100, an area in which the phase difference of the reception wave, which can be recognized by the radar apparatus, is smaller than ±180° is referred to as a C zone, an area that is positioned at the right side (+side) of the C zone is referred to as an A zone and an area that is positioned at the left side (−side) of the C zone is referred to as a B zone. Also, FIG. 9B shows reception levels (reception powers) of reflected signal by the two beam patterns BPS, BPW shown in FIG. 9A with respect to the azimuth.

In the second illustrative embodiment, the beam pattern BPS of the electric wave that is transmitted from the transmission antenna 1A shown in FIG. 1 has a narrow radiation range with respect to the central axis CL of the radar apparatus 100 and high power (transmission power) and the beam pattern BPW of the electric wave transmitted from the transmission antenna 1B has a wide radiation range with respect to the central axis CP and low power.

Figure 9B:
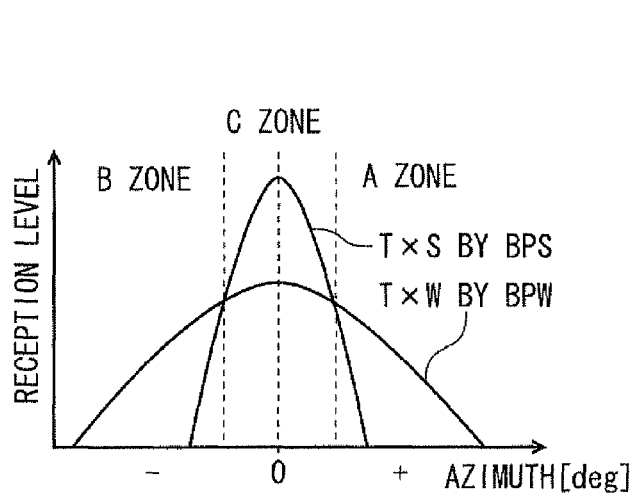
FIG. 9B shows reception levels of reflected signals by the two beam patterns shown in FIG. 9A with respect to an azimuth.
Figure 9C:
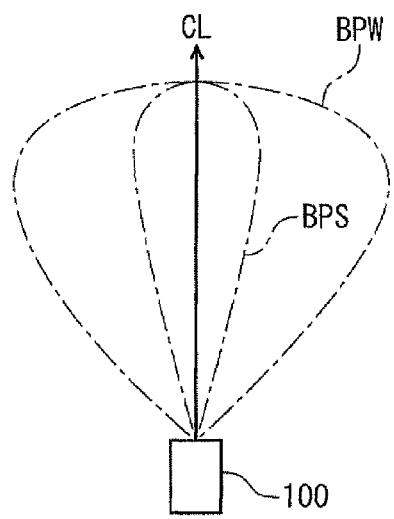
FIG. 9C shows a modified embodiment of the second illustrative embodiment of two beam patterns of transmission waves transmitted from two antennae shown in FIG. 9A.

FIG. 9B shows the reception levels with respect to the azimuth when the two beam patterns BPS, BPW are received.

When the electric wave having the beam pattern BPS is transmitted, the reception power of the reflected wave from the target in the C zone is high and the reception powers of the reflected waves from the targets in the A and B zones are low. In contrast, when the electric wave having the beam pattern BPW is transmitted, the reception level of the reflected wave from the target in the C zone is higher than the reception powers of the reflected waves from the targets in the A and B zones but is lower than the reception power of the reflected wave from the target in the C zone when the electric wave having the beam pattern BPS is transmitted. Also, the reception powers of the reflected waves from the targets in the A and B zones are lower than the reception power of the reflected wave from the target in the C zone but are higher than the reception powers of the reflected waves from the targets in the A and B zones when the electric wave having the beam pattern BPS is transmitted.

Also in the second illustrative embodiment, it is possible to calculate the arrival direction of the original reflected wave by determining the folding ghost state of the phase from the power difference of the reception levels with respect to the azimuth, i.e., the difference of the reception powers. That is, although the angle of the target obtained by the calculation exists in the C zone, when the actual target exists in the A or B zone that is the folding ghost area, the reception power TxW of the reflected wave by the beam pattern BPW is higher than the reception power TxS of the reflected wave by the beam pattern BPS. Also, when the actual target exists (i.e., there is no phase folding ghost), the reception power TxS is higher than the reception power TxW, Therefore, by comparing the reception power TxS and reception power TxW of the reflected waves from the directions of the angles obtained by the calculation, when the former is higher than the latter, it can be determined that the arrival direction is an arrival direction of the correct reflected wave having no folding ghost. On the other hand, when the former is higher than the latter, it can be determined that a folding ghost occurs and the arrival direction is not an arrival direction of the correct reflected wave.

By using the power difference, i.e., difference of the reception powers, it is possible to prevent the erroneous determination. In the meantime, the reception power described in the specification is an output of the FFT when the angle measuring method is a mono pulse method, and is a spectrum value of an extracted angle when an angle estimation unit is provided. In the meantime, when the angle estimation unit is provided, the accuracy is improved if a spectrum value of an angle, which is extracted by using the beam scanning method (DBF method, Capon method and the like), is calculated.

Figure 10A:
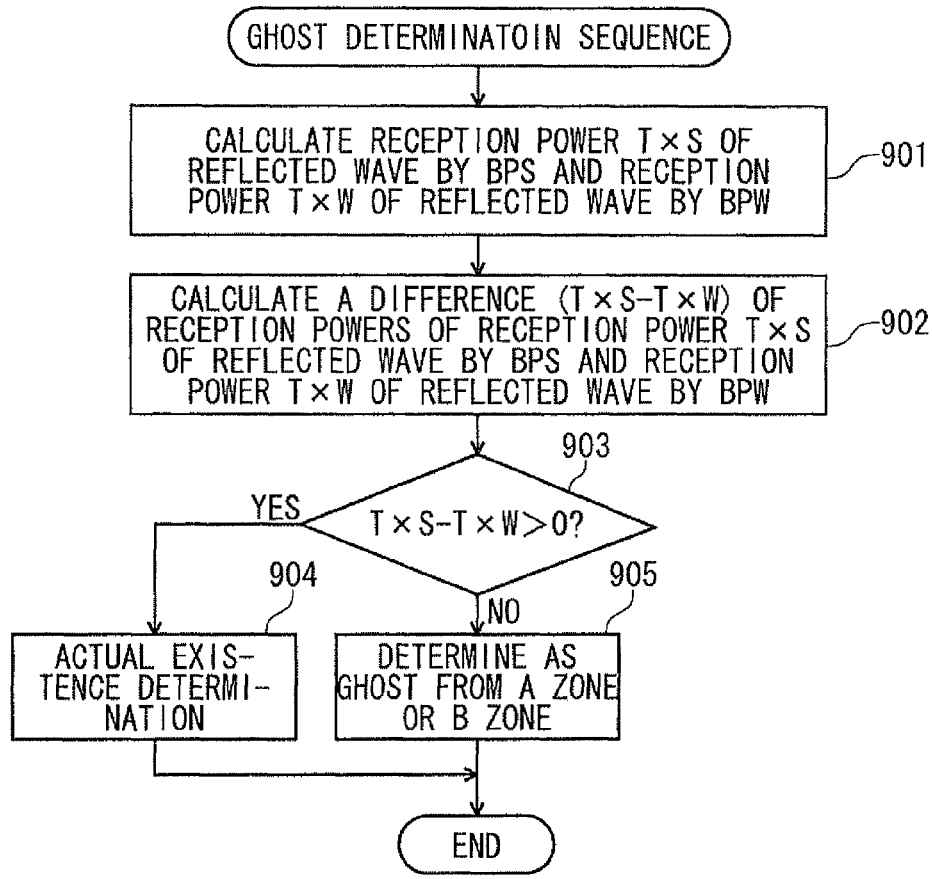
FIG. 10A is a flowchart showing an example of a sequence of a folding ghost determination when the beam patterns of the second illustrative embodiment are used in the radar apparatus of the invention and FIG. 10B is a partial flowchart showing an example of a sequence of a folding ghost determination when beam patterns of a modified embodiment of the second illustrative embodiment are used in the radar apparatus of the invention.

FIG. 10A is a flowchart showing an example of a sequence of a phase folding ghost determination when the beam patterns BPS, BPW of the second illustrative embodiment are used. The determination is performed after the azimuths of the beam patterns BPS, BPW are respectively detected by the azimuth calculation unit 15 of the signal processing apparatus P shown in FIG. 1. In a step 901, reception power TxS of the reflected wave by the beam pattern BPS and reception power TxW of the reflected wave by the beam pattern BPW from the same azimuth are calculated. In a step 902, a difference (TxS−TxW) between the reception power TxS and the reception power TxW is calculated.

In a step 903, it is determined whether the difference (TxS−TxS) between the reception power TxS and the reception power TxW is positive or not. When the difference between the reception power TxS and the reception power TxW is positive (YES), the process proceeds to a step 904, an actual existence determination of determining that the reflected wave is in the C zone and a target actually exists is performed and then the routine is ended. On the other hand, when the difference between the reception power TxS and the reception power TxW is not positive (NO), the process proceeds to a step 905, it is determined that the reflected wave is a folding ghost from the A or B zone (it is simply described in FIG. 7 that a ghost is determined) and then the routine is ended.

In the meantime, in a modified embodiment, the process of the step 902 may be omitted and the magnitudes of the reception powers TxS, TxW may be compared in the step 903 to determine whether a target actually exists or is a ghost. Also in this modified embodiment, the difference of the reception powers is also calculated.

Figure 11A:
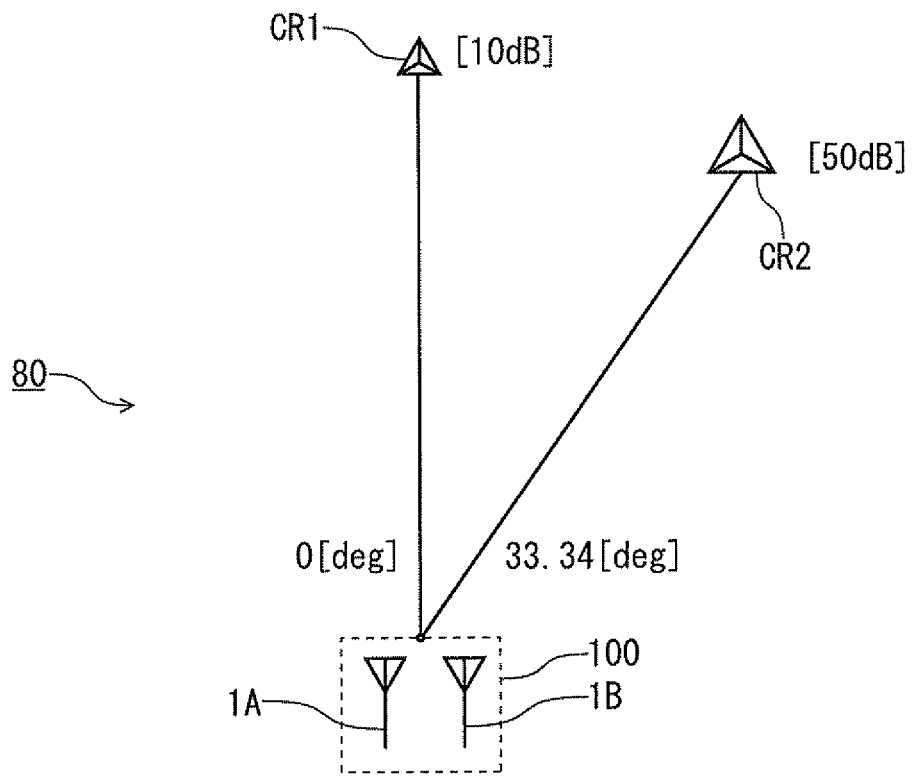
FIG. 11A shows a configuration of an evaluation apparatus having two corner reflectors having different sizes provided at positions of 0° and 33.34° at the front of the radar apparatus shown in FIG. 1.
Figure 11B:
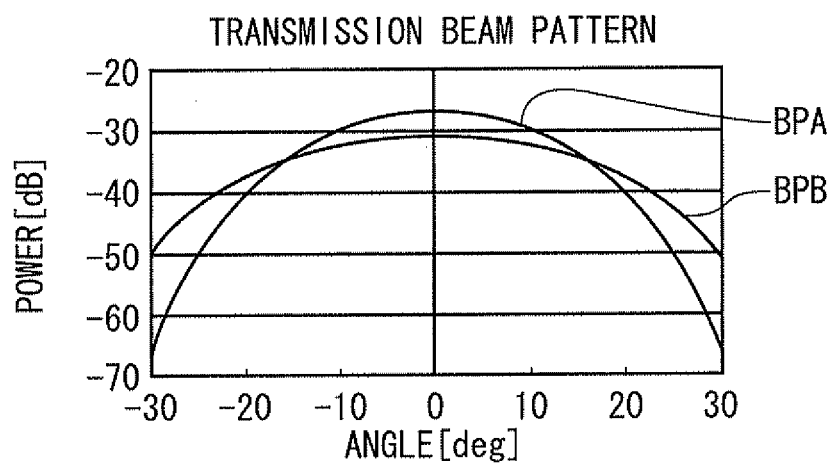
FIG. 11B shows an example of beam patterns transmitted from the two antennae shown in FIG. 11A.

Here, as shown in FIG. 11A, it is described a simulation using an evaluation apparatus 80 in which a corner reflector CR1 having a reflection level equivalent to 10 dB, which is a target, is located at an azimuth of 0° with respect to the radar apparatus 100 with a predetermined interval at the front of the radar apparatus 100 having the two antennae 1A, 1B and a corner reflector CR2 having a reflection level equivalent to 50 dB, which is a target, is located at an azimuth of 33.4° with a predetermined interval. The azimuth of 33.4° is an azimuth in which a phase folding ghost appears at the azimuth of the phase ghost 0°. The corner reflector CR2 is made to be larger than the corner reflector CR1 so as to easily see the reception results. At this time, a beam pattern BPA of the electric wave that is transmitted from the antenna 1A and a beam pattern BPB of the electric wave that is transmitted from the antenna 1B are shown in FIG. 11B. Here, the power of the beam pattern BPA is made to be higher than the power of the beam pattern BPB in a range within which a target is detected.

Figure 12A:
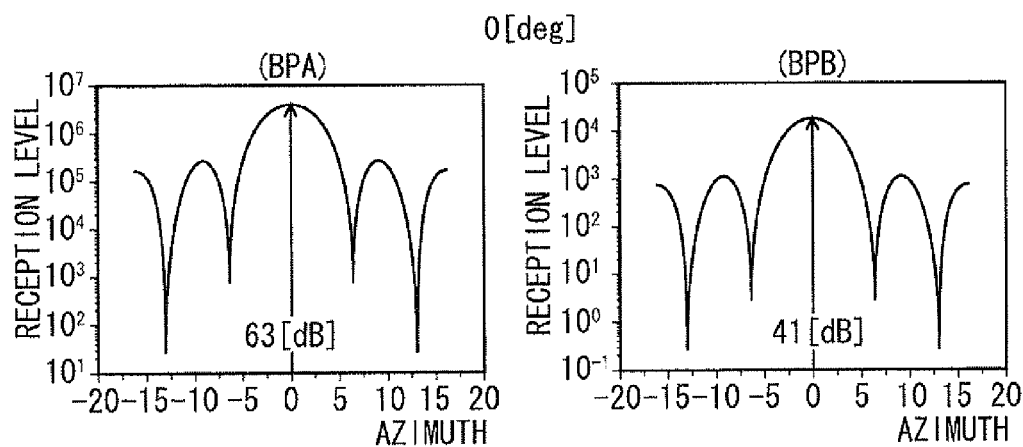
FIG. 12A shows reception levels of reflected waves from a target positioned at 0° when different beam patterns are transmitted from two antennae shown in FIG. 11B in the evaluation test configuration shown in FIG. 11A.

FIG. 12A shows reception levels of the reflected wave from the corner reflector CR1 located at the azimuth of 0° with respect to the azimuth, i.e., an angle spectrum when the simulation is performed by transmitting the beam patterns BPA, BPB shown in FIG. 11B from the antennae 1A, 1B, in the evaluation apparatus 80 shown in FIG. 11A. The reception level at the azimuth of 0° obtained by transmitting the beam pattern BPA was 63 dB and the reception level at the azimuth of 0° obtained by transmitting the beam pattern BPB was 41 dB. In this case, since the reception level obtained by transmitting the beam pattern BPA was greater than the reception level obtained by transmitting the beam pattern BPB, it is determined that the corner reflector is a correct target (detection object target) and the corresponding reception level is output.

Figure 12B:
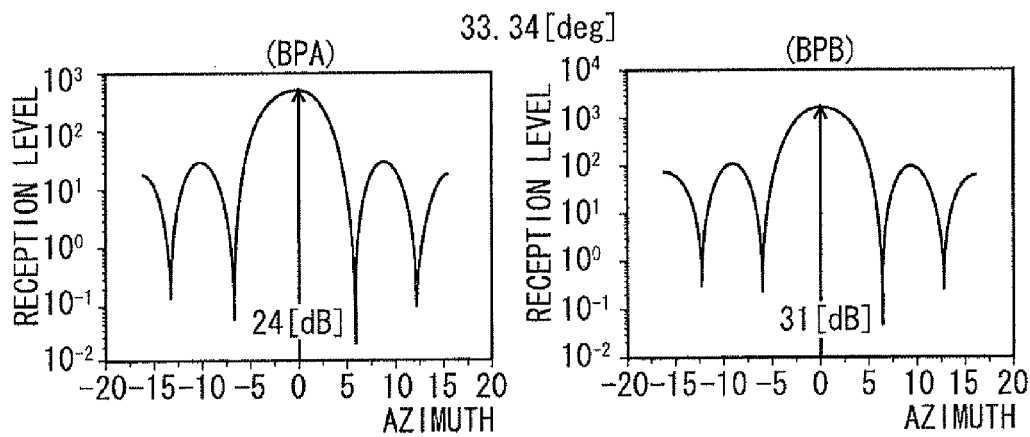
FIG. 12B shows reception levels of reflected waves from a target positioned at 33.34° when different beam patterns are transmitted from two antennae shown in FIG. 11B in the evaluation test configuration shown in FIG. 11A.

FIG. 12B shows reception levels of the reflected wave from the corner reflector CR2 located at the azimuth of 33.34° with respect to the azimuth when the simulation is performed by transmitting the beam patterns BPA, BPB shown in FIG. 11B from the antennae 1A, 1B, in the evaluation apparatus 80 shown in FIG. 11A. The reception level at the azimuth of 0° obtained by transmitting the beam pattern BPA was 24 dB and the reception level at the azimuth of 0° obtained by transmitting the beam pattern BPB was 31 dB. In this case, since the reception level obtained by transmitting the beam pattern BPA was smaller than the reception level obtained by transmitting the beam pattern BPB, it is determined that the corner reflector is a phase folding ghost (target beyond the detection object) and the reception level is not output. By the above determination, the phase folding ghost is prevented from being output.

In the second illustrative embodiment, the beam pattern BPS of the electric wave transmitted from the transmission antenna 1A has the high power and the beam pattern BPW of the electric wave transmitted from the transmission antenna 1B has the low power. Meanwhile, in a modified embodiment of the second illustrative embodiment, which is shown in FIG.

9C, the beam pattern BPS of the electric wave transmitted from the transmission antenna 1A and the beam pattern BPW of the electric wave transmitted from the transmission antenna 1B have the same power and only the radiation ranges thereof with respect to the central axis of the radar apparatus 100 are different. In the modified embodiment of the second illustrative embodiment, the beam pattern BPS of the electric wave transmitted from the transmission antenna 1A has a narrow radiation range and the beam pattern BPW of the electric wave transmitted from the transmission antenna 1B has a wide radiation range.

Figure 9D:
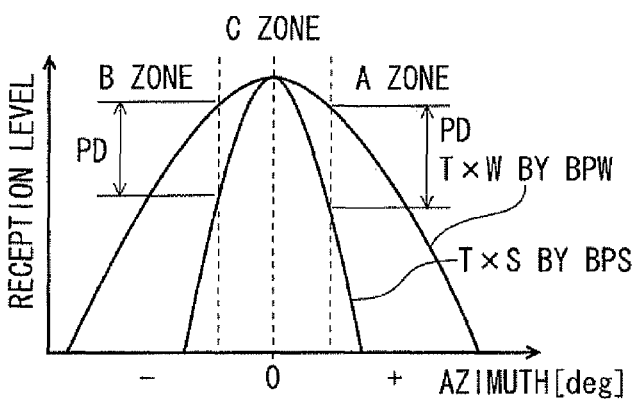
FIG. 9D shows reception levels of reflected signals by the two beam patterns shown in FIG. 9C with respect to an azimuth.

The reception levels with respect to the azimuth are shown in FIG. 9D when the above two beam patterns BPS, BPW are transmitted. When the electric wave having the beam pattern BPS is transmitted from the transmission antenna 1A, the reception power of the reflected wave from the target in the C zone is high and the reception powers of the reflected waves from the targets in the A and B zones are low. In contrast, when the electric wave having the beam pattern BPW is transmitted, the reception power of the reflected wave from the target in the C zone is highest but the reception powers of the reflected waves from targets in the A and B zones are also high. In the C zone, there is a part that is higher than the reception power of the reflected wave from the target in the C zone, which is obtained when the electric wave having the beam pattern BPS is transmitted.

Also here, it is assumed that the differences of the reception levels of the reflected waves by the beam patterns BPS, BPW at the boundary of the A zone and the C zone and the boundary of the B zone and the C zone are the same and the level differences are indicated by PD. In the modified embodiment of the second illustrative embodiment, based on a reference value that is the level difference (reception power difference) PD at the zone boundaries of the beam patterns BPS, BPW shown in FIG. 9D, it is possible to determine whether the reception power difference of the reflected waves is the reference value or greater, thereby performing the actual existence determination of the target and the determination of the phase folding ghost.

That is, in the A and B zones, the difference between the reception power of the reflected wave by the beam pattern BPW and the reception power of the reflected wave by the beam pattern BPS is larger than the reference value PD. Also, in the C zone, the difference between the reception power of the reflected wave by the beam pattern BPW and the reception power of the reflected wave by the beam pattern BPS is smaller than the reference value PD. Accordingly, when the difference of the reception powers is smaller than the reference value PD, it can be determined that the target is a correct target and when the difference of the reception powers is larger than the reference value PD, it can be determined that the target is a phase folding ghost.

Figure 10B:
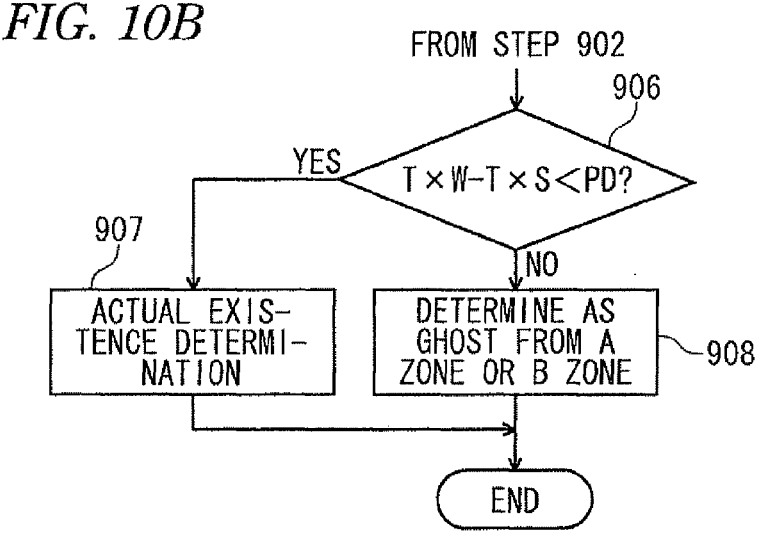

FIG. 10B is a flowchart showing an example of a sequence of a folding ghost determination when the beam patterns of the modified embodiment of the second illustrative embodiment are used. Since the steps 901 and 902 are the same, they are not shown.

In the step 902, when the power difference between the reception power TxS and the reception power TxW of the reflected waves is calculated, it is determined in a step 906 whether the power difference (TxW−TxS) is smaller than the reference value PD. When (TxW−TxS)<PD (YES), the process proceeds to a step 907 and the actual existence determination of the target is performed. Otherwise (NO), it is determined in a step 908 that the target is a phase folding ghost from the A or B zone. That is, in the C zone, when the difference between the reception power TxS and the reception power TxW is small and they are equivalent, it is determined that the target is a correct target (detection object target), and when the reception power TxW is larger than the reception power TxS by above the reference value PD, it is determined that the target is a phase folding ghost (target beyond the detection object). By performing the determination as described above, the phase folding ghost is prevented from being output, also in the modified embodiment of the second illustrative embodiment.

Meanwhile, also in the modified embodiment of the second illustrative embodiment, it may be possible to determine whether a target actually exists or is a ghost by comparing one reception power +PD with the other reception power without calculating the difference of the reception powers in the step 902.

What is claimed is:

1. A radar apparatus of an electronic scan type configured to transmit an electric wave and calculate an angle of a target based on a phase difference of respective reception signals which are obtained by receiving reflected waves at a plurality of receiving antennae, thereby detecting a target position, the radar apparatus comprising:
   an antenna unit configured to transmit and receive the electric wave and provided with two transmission antennae;
   a transmission unit configured to alternately transmit an electric wave having a first beam pattern and an electric wave having a second beam pattern from the two transmission antennae, the first beam pattern and the second beam pattern being different from each other;
   a first reception unit configured to calculate an arrival angle and a reception level of a reflected wave calculated from respective reception signals which are obtained by receiving the reflected wave by the first beam pattern;
   a second reception unit configured to calculate an arrival angle and a reception level of a reflected wave calculated from respective reception signals which are obtained by receiving the reflected wave by the second beam pattern;
   a comparison unit configured to compare the reception levels calculated by the first and second reception units by combining the arrival angles of the reflected waves, and determine (i) whether a level difference between the reception level calculated by the first reception unit and the reception level calculated by the second reception unit is a predetermined reception level difference or greater and (ii) whether the reception level calculated by the first reception unit is greater than the reception level calculated by the second reception unit; and
   a determination unit configured to determine a location of a target in accordance with a determination result of the comparison unit such that whether the target actually exists at the arrival angles of the reflected waves and a direction of the target when the target does not actually exist at the arrival angles of the reflected waves.

2. The radar apparatus according to claim 1, wherein the first beam pattern and the second beam pattern have the same beam pattern shape, a transmission axis of the first beam pattern is rightward inclined by a predetermined angle and a transmission axis of the second beam pattern is leftward inclined by the predetermined angle where a front of the radar apparatus is considered as 0°.

3. The radar apparatus according to claim 2, wherein the first beam pattern and the second beam pattern have an overlapping area at the front of the radar apparatus.

4. The radar apparatus according to claim 3,
   wherein the determination unit determines that the target actually exists at the arrival angles of the received reflected waves when an absolute value of the difference of the reception levels of the reflected waves received by the first and second reception unit is smaller than a reference level, and wherein the determination unit determines that the target does not actually exist at the arrival angles of the received reflected waves when the absolute value of the difference of the reception levels of the reflected waves received by the first and second reception unit is larger than the reference level.

5. The radar apparatus according to claim 1, wherein the first beam pattern and the second beam pattern have the same transmission axis, the first beam pattern has a beam transmission width narrower than that of the second beam pattern and a transmission output higher than that of the second beam pattern and the first beam pattern and the second beam pattern have an overlapping area at the front of the radar apparatus.

6. The radar apparatus according to claim 5, wherein the determination unit determines that the target actually exists at the arrival angles of the reflected waves when the reception level of the reflected wave received by the first reception unit is larger than the reception level of the reflected wave received by the second reception unit, and wherein the determination unit determines that the target does not actually exist at the arrival angles of the reflected waves when the reception level of the reflected wave received by the first reception unit is equal to or smaller than the reception level of the reflected wave received by the second reception unit.

7. The radar apparatus according to claim 1, wherein the first beam pattern and the second beam pattern have the same transmission axis, the first beam pattern has a beam transmission width narrower than that of the second beam pattern and a transmission output equal to that of the second beam pattern and the first beam pattern and the second beam pattern have an overlapping area at the front of the radar apparatus.

8. The radar apparatus according to claim 7, wherein the determination unit determines that the target does not actually exist at the arrival angles of the received reflected waves when a difference of the reception levels of the reflected waves received by the first and second reception units is larger than a reference value.

9. A radar apparatus of an electronic scan type configured to transmit an electric wave and calculate an angle of a target based on a phase difference of respective reception signals which are obtained by receiving reflected waves at a plurality of receiving antennae, thereby detecting a target position, the radar apparatus comprising:

an antenna unit configured to transmit and receive the electric wave and provided with two transmission antennae;

a transmission unit configured to alternately transmit an electric wave having a first beam pattern and an electric wave having a second beam pattern from the two transmission antennae, the first beam pattern and the second beam pattern being different from each other;

a first reception unit configured to calculate an arrival angle and a reception level of a reflected wave calculated from respective reception signals which are obtained by receiving the reflected wave by the first beam pattern;

a second reception unit configured to calculate an arrival angle and a reception level of a reflected wave calculated from respective reception signals which are obtained by receiving the reflected wave by the second beam pattern;

a comparison unit configured to compare the reception levels calculated by the first and second reception units by combining the arrival angles of the reflected waves; and a determination unit configured to determine a location of a target in accordance with a comparing result of the comparison unit such that whether the target actually exists at the arrival angles of the reflected waves and a direction of the target when the target does not actually exist at the arrival angles of the reflected waves.

* * * * *